United States Patent [19]

Masuda

[11] Patent Number: 4,810,394

[45] Date of Patent: Mar. 7, 1989

[54] PROCESS AND APPARATUS FOR REMOVING SOLID MATERIAL INCLUDING BLOOD CELLS FROM WHOLE BLOOD

[75] Inventor: Nobuhito Masuda, Asaka, Japan

[73] Assignee: Fuji Photo Film Co., Ltd., Japan

[21] Appl. No.: 94,034

[22] Filed: Sep. 2, 1987

Related U.S. Application Data

[63] Continuation of Ser. No. 915,907, Oct. 6, 1986, abandoned, which is a continuation of Ser. No. 760,634, Jul. 30, 1985, abandoned.

[30] Foreign Application Priority Data

Jul. 31, 1984 [JP] Japan ................................. 59-158784

[51] Int. Cl.$^4$ ...................... B01D 25/06; B01D 39/02
[52] U.S. Cl. ..................................... 210/767; 210/491; 210/492; 210/505; 422/101; 436/177; 435/2
[58] Field of Search ............. 422/101; 210/406, 416.1, 210/492, 503, 807, 808, 491, 505, 806; 435/2; 436/177

[56] References Cited

U.S. PATENT DOCUMENTS

| | | | |
|---|---|---|---|
| 3,050,373 | 8/1962 | Collins | 436/169 X |
| 3,448,041 | 6/1969 | Swank | 210/774 |
| 4,073,723 | 2/1978 | Swank et al. | 210/774 |
| 4,116,845 | 9/1978 | Swank | 210/446 |
| 4,246,107 | 1/1981 | Takenaka et al. | 210/259 |
| 4,416,777 | 11/1983 | Kuroda et al. | 210/317 |

*Primary Examiner*—W. Gary Jones
*Attorney, Agent, or Firm*—Ostrolenk, Faber, Gerb & Soffen

[57] ABSTRACT

An instrument for separation of liquid from solid material comprising: a volume filtration layer having a void volume of not less than 90% which is composed of fibrous material; and a pressure-resistant housing having a liquid entrance and a liquid exit which encases said volume filtration layer therein in such a manner that the side face of the volume filtration layer is tightly arranged in contact with an inner face of the housing so as to prevent passage of the solid material along the interface between the side face of the volume filtration layer and the inner face of the housing.

16 Claims, 1 Drawing Sheet

PROCESS AND APPARATUS FOR REMOVING SOLID MATERIAL INCLUDING BLOOD CELLS FROM WHOLE BLOOD

This is a continuation of application Ser. No. 915,907, filed on Oct. 6, 1986, now abandoned, which is a continuation of application Ser. No. 760,634, filed July 30, 1985, now abandoned.

BACKGROUND OF THE INVENTION

1. Field of the invention

The present invention relates to an instrument for separating liquid from solid material in solid material-containing liquid samples and a process utilizing the instrument. This instrument is designed to be advantageously employable in combination with a dry analytical element.

2. Description of prior art

There are already known a number of analytical systems for detecting and quantitatively determining biochemically active analytes in a liquid sample by using a dry analytical element in the layer or sheet form. For example, U.S. Pat. No. 3,050,373 is mentioned. According to these analytical systems, a component to be analyzed (i.e., analyte) contained in the liquid sample and a reactive compound responsive physically or chemically to the analyte are brought into contact with each other to perform a reaction. An amount of the reaction product or the unreacted substance is then determined by photometry, fluorometry, or a method using a radioactive isotope, to quantitatively determine the analyte.

In the use of whole blood as the liquid sample, the trouble resides in that dense-colored solid materials such as red blood cells disturb the photometric determination. In heretofore known procedures, it has been proposed that a blood cell filtration layer be specifically provided to trap the red blood cells therein. A representative blood cell filtration layer is described in Japanese Patent Publication No. 53(1978)-21677 and is composed of a porous material having an appropriate porosity to filter off the blood cells and the like on the surface of the layer. Accordingly, it is suggested that the pore size of the filtration layer is set to be in the range of 1 to 5 $\mu$m which is smaller than the blood cell size (i.e., 7-30 $\mu$m). Under these conditions, the blood cells and the like do not permeate the filtration layer and are left on the surface of the layer. This filtration is named "surface filtration". Thus, the liquid portion such as serum or plasma is separated from blood cells and the like. The analytical procedure using an analytical element provided with the filtration layer such as above is advantageous as compared with the conventional procedure involving centrifugal pretreatment of whole blood. However, the filtration rate is not high, and futher, plugging sometimes occurs.

Japanese Patent Provisional Publication No. 57(1982)-53661 discloses an instrument for recovering serum or plasma by removing solid material from blood on a layer which is composed of specific glass fibers having a density of 0.1 to 0.5 g/cm$^3$ and a mean diameter of 0.2 to 0.5 $\mu$m. It is not said that this separation instrument shows satisfactory blood cell-separation ability. For instance, the working example in the publication shows a practical separation of serum (or plasma) from blood cells by setting the amount of serum or plasma to not more than 50% of the whole absorbing capacity of the layer and further by providing a hydrophobic barrier layer.

SUMMARY OF THE INVENTION

An object of the present invention is to provide an instrument for separation of liquid from solid material which is almost free from plugging.

Another object of the invention is to provide an instrument for separation of liquid from solid material which is employable in place of centrifugal separation.

A further object of the invention is to provide an instrument for separation of liquid from solid material which can be manufactured in small size.

A still further object of the invention is to provide an instrument for separation of liquid from solid material which can be handled easily without requiring skill and training.

A still further object of the invention is to provide an instrument for separation of liquid from solid material which makes it possible to recover the liquid portion in a good yield.

A still further object of the invention is to provide an instrument for separation of liquid from solid material which makes it possible to shorten the period required for the separation.

A specific object of the invention is to provide an instrument for separation of a liquid portion out of whole blood, fogged urine sample or body fluid, chylous serum, in a manner of almost free from plugging.

The present invention resides in an instrument for separation of liquid from solid material comprising:

a volume filtration layer having a void volume of not less than 90% which is composed of fibrous material; and a pressure-resistant housing having a liquid entrance and a liquid exit which encases said volume filtration layer therein in such a manner that the side face of the volume filtration layer is tightly arranged in contact with an inner face of the housing so as to prevent passage of the solid material along the interface between the side face of the volume filtration layer and the inner face of the housing.

DETAILED DESCRIPTION OF THE DRAWINGS

Figure 1:
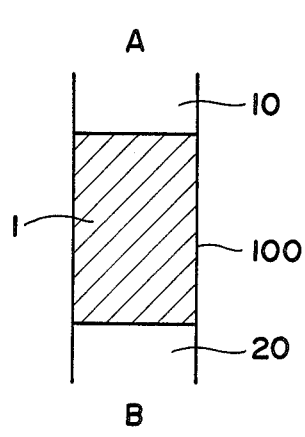
FIG. 1 is a section schematically illustrating an elemental structure of the instrument for separation of liquid from solid material according to the present invention.

The mechanism of separation taking place in the separation instrument of the present invention is based not on surface filtration but on volume filtration. Volume filtration means filtration in which solid materials are trapped within a three-dimensional matrix of the layer, thereby performing efficient separation of liquid from solid material.

The instrument for separation of liquid from solid material of the invention comprises a pressure-resistant housing of liquid-impermeable material and a volume filtration layer of fibrous material. The volume filtration layer is arranged within the housing to give a partition between the liquid entrance area space and the liquid exit area space. The volume filtration layer is arranged in such a manner that the side face of the volume filtration layer is tightly arranged in contact with an inner face of the housing. The volume filtration layer is fixed onto the inner face of the housing so as to prevent passage of the solid material along the interface between the side face of the volume filtration layer and the inner face of the housing.

Upon application of a solid material-containing liquid on the volume filtration layer, the solid material is trapped within the three-dimensional matrix of the filtration layer and at the same time the liquid passes through the layer toward the liquid exit. The volume filtration layer is composed of fibrous material to give voids arranged at random. The solid material is encased within the randomly arranged voids. In contrast, the liquid flows in the direction to the exit. This brings about certain lag of movement between the solid material and the liquid. It is advantageous to provide some pressure difference between the entrance portion and the exit portion by an appropriate pressing or pressure-reducing means. In the presence of the pressure difference, the liquid separated from the solid material within the volume filtration layer moves smoothly and rapidly toward the exit without remaining in the layer. Accordingly, the liquid is recovered in a good yield which corresponds to the amount produced on the above-mentioned lag of movement.

Examples of the fibrous material employable for the formation of the volume filtration layer include inorganic fibers such as glass fibers and asbestos; natural organic fibers such as cotton fiber, pulp and silk; semi-synthetic and synthetic fibers such as viscose rayon, cuprammonium rayon, cellulose acetate, partially formalized polyvinyl alcohol, polyethylene, polypropylene, polyvinyl chloride, polystyrene, polyester (e.g., polyethylene terephthalate); woven fabric composed of these fibers; and knitted material composed of these fibers.

The employable woven fabrics include a variety of fabric. Among the woven fabrics, plain weave fabrics made of warp and weft are preferred. Among plain weave fabrics, thin cloth, muslin, broadcloth and poplin are preferred. The similar fabrics of other materials such as natural fibers such as kapok, flax, hemp, ramie and silk, chemical fibers such as fibers of viscose rayon, cuprammonium rayer, cellulose acetate, vinylon and polyetheylene terephthalate and mixtures of cotton fiber and chemical fibers are also employable.

Among these fibrous materials, the glass fiber is particularly preferred. The fibrous materials can be subjected to any of a variety of treatments such as a treatment for rendering hydrophilic, a treatment for removing absorbing capacity, and a treatment for imparting absorbing capacity before or after the formation of layer.

The volume filtration layer generally has a void volume of not less than approx. 90%, preferably not less than 95% and up to 98%. In view of the objects of the present invention, the fibrous material preferably has a thickness in the range of approx. 0.1 to 5 $\mu$m and a length in the range of approx. 100 to 4,000 $\mu$m. The fibers of the preferred ranges can be obtained by classification using a sieve of approx. 100-200 mesh (Tyler's mesh). The void volume is generally selected depending on the particle size of the solid material to be removed. For instance, blood cells are preferably filtered off using a volume filtration layer of glass fibers in a density of approx. 0.02 to 0.15 g/cm$^3$, particularly in a density of approx. 0.04 to 0.08 g/cm$^3$.

The housing employed for the formation of a separation instrument of the invention is made of a liquid-impermeable material and possesses a space for encasing the aforementioned volume filtration layer therein.

There is no specific limitation on the shape of the housing, as long as the housing can encase the volume filtration layer therein keeping it for preventing passing of the liquid sample along the interface between the inner face of the housing and the side face of the volume filtration layer. A most advantageous and simple shape may be a narrow cylinder illustrated in FIG. 1. The structure having an exit of narrower diameter than the diameter of the main body encasing the volume filtration layer is preferred to efficiently recover the separated liquid. The separation instrument can be employed in conjunction with an independently designed adaptor for performing measurement of the volume of the liquid sample as well as the analysis.

There is no specific limitation on the shape and structure of the liquid entrance, as far as the entrance allows introduction of the liquid sample into the volume filtration layer. Accordingly, a simple opening can serve as the entrance.

Figure 2:
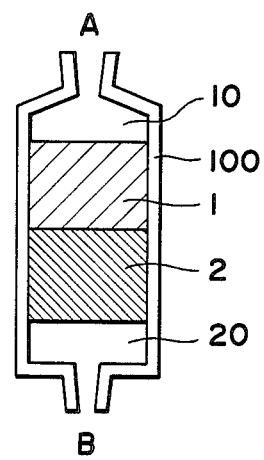
FIG. 2 is a section schematically illustrating an embodiment of the instrument for separation of liquid from solid material according to the invention.

The separation instrument of the invention can be so shaped as to match with a liquid supplying instrument (e.g., blood collecting syringe) for employment in conjunction, as illustrated in FIG. 2.

The liquid impermeable material employed for the preparation of the housing may be a polymer material having a glass transition temperature of not lower than room temperature, one of other plastics, glass, and ceramic.

A solid material-containing liquid sample such as a whole blood sample is supplied through the entrance directly or using a pipette, dispensor, syringe, etc. The supplied whole blood sample is subjected to volume filtration within the volume filtration layer so that blood cells are trapped inside of the layer and plasma moves toward the exit. As described previously, the movement of the liquid is preferably accelerated by the application of a moderate pressure difference using an appropriate pressing or pressure-reducing means. One of these means may be installed separately from the separation instrument or attached to the separation instrument. The application of the pressure difference for causing rapid movement of the liquid toward the liquid exit can be employed only in a filtration system functioning to carry out volume filtration of liquid from solid material. If such a pressure difference is introduced into a conventional separation system based on surface filtration of liquid from solid material, the blood cells trapped on the upper surface of the filtration layer are broken and undergo hemolysis. Accordingly, the difference of filtration system gives significant difference on the yield of liquid recovery.

For instance, in the case that the separation of liquid from solid material in 1 ml. of a whole blood sample is performed under pressure difference using the separation instrument of the invention, plasma amounting to several tens % based on the theoretical amount is recovered within a short period of time such as within a few minutes. In the case of relying on the surface filtration as in the conventional process, the recoverable plasma amounts at most to 10% (e.g., 20-30 $\mu$l per 1 ml. of a whole blood sample) and the filtration requires a long period of time. Moreover, as the time passes by, the filtration layer is partially plugged so as to cause hemolysis. Thus resulting plasma is not appropriate for use in analysis.

The degree of the pressure difference applied on the volume filtration layer is determined depending on the viscosity of the liquid sample, nature, density, and void volume of the material of the filtration layer, and so forth, but should be not higher than approx. 1 atmosphere. Under the pressure difference up to such level, the movement of liquid is accelerated without occurence of hemolysis.

The separation instrument of the present invention preferably has a solid material-trapping layer on the surface of the volume filtration layer on the exit side. The solid material-trapping layer traps solid materials having leaked out of the volume filtration layer. Such leakage of the solid material may accidentally happen or may be caused by wrongly set pressure difference, liquid application rate, etc. The solid material-trapping layer functions based on the surface filtration for preventing leakage of the solid material into the exit.

The solid material-trapping layer is fixed onto the inner face of the housing by its side face in the same manner as the volume filtration layer. The solid material-trapping layer not only prevents leakage of the solid material but also accelerates the movement of the liquid through absorbing power caused due to a specific arrangement that the solid material-trapping layer is made more dense than the volume filtration layer.

The solid material-trapping layer is a porous layer composed of a fibrous or non-fibrous porous material. The solid material-trapping layer is advantageously prepared to have more dense structure than the volume filtration layer has. In other words, the solid material-trapping layer preferably has a mean pore size of smaller than the void size of the volume filtration layer. In the case that the solid material-filtration layer is made of glass fibers, the void volume preferably is in the range of approx. 65 to 95%, more preferably in the range of approx. 70 to 93%, and the density of the layer preferably is in the range of 0.1 to 0.5 g/cm$^3$.

The solid material-trapping layer can be prepared from a fibrous material as mentioned for the preparation of the volume filtration layer. The adjustment of the void volume of the solid material-trapping layer can be made by pressing or the like.

The solid material-trapping layer can be made of a non-fibrous material. Representative examples of the non-fibrous material include blushed polymers which are produced by processing polymers such as polycarbonates, polyamides and cellulose esters in a known manner. As the blushed polymers, there are mentioned Microfilter (tradename, available from Fuji Photo Film Co., Ltd.), Milipore (tradename, available from Milipore Corp.) and Methylicel (tradename, available from German Instrument Corp.), all of which are commercially available.

Some of the porous materials are described in detail in Japanese Patent Provisional Publications No. 49(1974)-53888 and No. 55(1980)-164356 and U. S. Pat. No. 3,992,158. Moreover, the details of the preparation of the layer are given in the copending U.S. patent application Ser. No. 728,404 and European Patent Application No. 85105215.9.

The separation instrument of the present invention can have a net structure on the exit-side surface of the volume filtration layer, on the interface between the volume filtration layer and the solid material-trapping layer, or on the exit-side surface of the solid material-trapping layer so that the volume filtration layer can be mechanically reinforced. Preferred examples of the net structure include nets of polyesters, polyamides and polyurethanes, sieves thereof, nets for collecting planktons, veils, and glass filters.

FIG. 1 is a section schematically illustrating an elemental structure of the separation instrument of the present invention. The numeral 100 indicates a housing (or hollow support member). The numeral 1 indicates a volume filtration layer which extends along the lateral section of the hollow space of the housing 100 to divide it into two spaces, that is, a space 10 on the side of the liquid entrance A and a space 20 on the side of the liquid exit B. The volume filtration layer 1, for instance, is prepared in the form of a disk from a glass fiber sheet of a density of 0.06 g/cm$^3$ to have a volume of approx. 0.3 ml. The volume filtration layer is tightly fixed to the inner surface of the housing 100 so as to prevent leakage of the solid material contained in an applied liquid sample. The solid material-containing liquid sample such as a whole blood sample is supplied onto the volume filtration layer 1 through the entrance A directly or indirectly. Subsequently, the upper surface of the volume filtration layer is pressed at a pressure difference of 0.025 atm. pressure. The blood cells are three-dimensionally trapped inside of the layer and only the liquid portion such as serum and plasma rapidly moves toward the exit B. Theoretically, 1 ml. of a whole blood sample gives approx. 0.5 ml of a liquid portion. According to a recently employed sheet tupe analytical element, a sample amounting to 10 μl is enough for performing a clinical test on single item. Therefore, if the yield of the liquid portion is approx. 25% (recovery of 0.12 ml of liquid portion, i.e., plasma, from 1 ml. of blood sample), the clinical test can be performed on ten items.

FIG. 2 is a section schematically illustrating an embodiment of the separation instrument according to the invention.

In this embodiment, a solid material-trapping layer 2 is provided next to the surface of the volume filtration layer 1 on the exit B side (or in the space 20). The solid material-trapping layer 2 is prepared, for example, in the form of a disk from glass filter sheets having a density of approx. 0.21 g/cm$^3$ to have a volume of approx. 0.3 ml. Accordingly, the composite layer, that is, a combination of the volume filtration layer and the solid material-trapping layer, has totally a volume of approx. 0.6 ml. The composite structure can be formed by simply combining the volume filtration layer 1 and the solid material-trapping layer 2. Otherwise, the composite structure can be formed by a paper-making process to give a single unit structure. Thus formed, a separation instrument can be employed in the same manner as in the embodiment illustrated in FIG. 1. Since the separation instrument shown in FIG. 2 is equipped with the solid material-trapping layer 2, this instrument can be employed under a larger pressure difference and moreover gives an increase of the liquid recovery.

Figure 3:
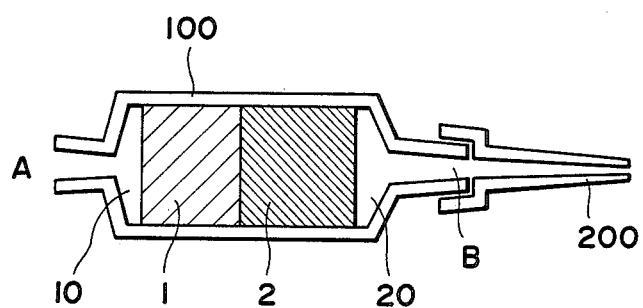
FIG. 3 is a section schematically illustrating a combination of another embodiment of the instrument according to the invention and a liquid-receiving means.

FIG. 3 is a section schematically illustrating a combination of an embodiment of the instrument according to the invention and a liquid-receiving means (adaptor) 200. According to the embodiment shown in FIG. 3, the liquid separated from the solid material in the layers is directly received by the adaptor. Therefore, no loss is expected on the separated liquid, and moreover the recovery of the liquid can be controlled to match with the capacity of the adapter.

The instrument of the invention for separating a liquid from a solid material can be employed singly or in combination with other liquid-supplying means or liquid-receiving means. In any case, the instrument enables to efficiently separate a liquid out of a solid material-containing liquid. Further, only a shorter period of time is required to accomplish the desired separation. Furthermore, no skill is required in the separation procedure. The operation involved in the separation procedure is very simple.

The instrument of the invention can be formed in a simple structure, and accordingly is available at a low cost. Further, it is very easy to prepare a compact instrument according to the invention.

Moreover, the use of the instrument of the invention makes it unnecessary to transfer the liquid sample which is generally done in the conventional separation process involving centrifugal separation. Therefore, the liquid sample can be handled without receiving biological contamination. It may be advantageous to employ the separation instrument of the invention in combination with a known sheet-type analytical element to conduct biochemical analysis such as a clinical test.

The present invention is further described by the following examples.

EXAMPLE 1

(1) Preparation of glass fiber dispersion

A glass fiber filter GA-100 (Toyo Filter Paper Co., Ltd., Japan) was cut to prepare square pieces (approx. 2 mm×2 mm) and dispersed in 800 ml of water by means of a homogenizer (Ace Homogenizer AM-11, manufactured by Nippon Seiki Co., Ltd., Japan). The dispersion was filtered over a sieve of Tyler mesh No. 12 to remove lumps of fibers. The resulting glass fiber dispersion contained 15 mg. of glass fibers per 10 ml (determined by filtering the dispersion on a membrane filter having a pore size of 0.22 $\mu$m (Microfilter, tradename, produced by Fuji Photo Film Co., Ltd.) and weighing the glass fibers collected on the filter after drying).

(2) Preparation of instrument for separation of plasma

In a syringe of plastic material having an inner diameter of 6 mm is charged a small amount of glass wool (generally employed in gas chromatographic column) to form a filter. On the filter was placed 80 ml of the glass fiber dispersion prepared in step (1) above to form a glass fiber layer. The formed layer was freeze-dried in the wet condition and then dried under reduced pressure. The resulting glass fiber layer (volume filtration layer) had a volume of approx. 1.5 ml.

(3) Separation of plasma from whole blood

A blood sample was collected, and heparin sodium was immediately added to the blood in an amount of 1/200 of the amount of the blood. One ml. of the so treated blood was slowly introduced into the separation instrument prepared in (2) above. A piston was introduced into the syringe and pushed slowly in such a manner that the piston advances by a length corresponding to 0.05 ml per 10 sec. A liquid discharged from the end of the syringe was continuously collected. When leakage of blood cells was noted, the collection was ended. Approx. 100 $\mu$l. of plasma was collected: yield approx. 20%.

No hemolysis was observed.

Accordingly, it was confirmed that the separation instrument worked for obtaining a plasma rapidly and simply.

EXAMPLE 2

(1) Preparation of separation instrument equipped with solid material-trapping layer In the same syringe of an inner diameter of 6 mm as in Example 1 was introduced 30 sheets of disks (diameter 6 mm) of a glass fiber filter GA-100 (approx. 90 mg.) to make a voluminous layer. The resulting voluminous layer was compressed by means of a piston to give a layer having a volume of approx. 0.4 ml.

(2) Preparation of volume filtration layer

On the solid material-trapping layer prepared in step (1) above was placed a glass fiber dispersion (solid material 8 mg/10 ml of dispersion) prepared in the same manner as in Example 1-step (1) to form a glass fiber layer. The resulting layer was freeze-dried in the wet state and dried.

(3) Separation of plasma from whole blood

One ml. of the blood which was treated to contain heparin sodium in the same manner as in Example 1—step (3) was slowly introduced into the separation instrument prepared in step (2) above. A piston was introduced into the syringe and pushed slowly in such a manner that the piston advances by a length corresponding to 0.05 ml per 10 sec. A liquid discharged from the end of the syringe was continuously collected. When leakage of blood cells was noted, the collection was ended. Approx. 200 $\mu$l. of plasma was collected: yield approx. 40%.

No hemolysis was observed.

Accordingly, it was confirmed that the separation instrument worked for obtaining a plasma rapidly and simply.

I claim:

1. A process for removing solid material including blood cells from whole blood to obtain plasma, utilizing an instrument comprising a volume filtration layer and a solid-material-trapping porous layer encased in a pressure-resistant housing, said volume filtration layer having a void volume of not less than 90% and being essentially composed of fibrous material having fiber thickness in the range of 0.1 to 5 $\mu$m and fiber length in the range of 100 to 4,000 $\mu$m, said solid-material-trapping porous layer being of fibrous material or a blushed polymer and being provided in contact with the surface of the volume filtration layer, said pressure-resistant housing having a liquid entrance and a liquid exit and encasing said volume filtration layer and said solid-material-trapping layer in such manner that side faces of the volume filtration layer and the solid material-trapping layer are arranged in tight contact with an inner face of the housing, said process comprising the steps of:

supplying the whole blood onto the surface of the volume filtration layer through the liquid entrance of the housing to trap the solid material of the whole blood within the volume of the layer and on the surface of the solid-material-trapping layer; and recovering the plasma from the liquid exit of the housing.

2. The process as claimed in claim 1, wherein the void volume of the volume filtration layer is in the range of 95 to 98%.

3. The process as claimed in claim 1, wherein the void volume of the solid material-trapping layer is in the range of 65 to 95%.

4. The process as claimed in claim 1, wherein the volume filtration layer has a density of 0.02 to 0.15 g/cm$^3$.

5. The process as claimed in claim 1, wherein the volume filtration layer has a density of 0.04 to 0.08 g/cm³.

6. The process as claimed in claim 1, wherein the solid-material-trapping layer is essentially composed of glass fibers and having a density of 0.1 to 0.5 g/cm³.

7. The instrument as claimed in claim 1, wherein the volume filtration layer is essentially composed of a fibrous material selected from the group consisting of glass fibers, natural organic fibers, semi-synthetic organic fibers or synthetic organic fibers.

8. The instrument as claimed in claim 1, wherein the solid-material-trapping layer is made of a fibrous material selected from the group consisting of glass fibers, natural organic fibers, semi-synthetic organic fibers, synthetic organic fibers or blushed polymer.

9. An instrument for removing solid material including blood cells from whole blood to obtain plasma comprising:
   means including a volume filtration layer having a void volume of not less than 90% which is essentially composed of fibrous material having fiber thickness in the range of 0.5 μm and fiber length in the range of 100 to 4,000 μm for receiving said blood and trapping said solid material within its volume;
   means including a porous solid-material-trapping layer of a material selected from the group consisting of fibrous material and blushed polymer, provided in contact with the surface of the volume filtration layer, for receiving solid material from said volume filtration layer and trapping said solid material by surface filtration thereof; and
   a pressure-resistant housing having a liquid entrance and a liquid exit which encases said volume filtration layer and said solid-material-trapping layer, wherein side faces of the volume filtration layer and the solid-material-trapping layer are arranged in contact with an inner face of the housing so as to prevent passage of the solid material along the interface between the side faces of both layers and the inner face of the housing.

10. The instrument as claimed in claim 9, wherein the void volume of the volume filtration layer is in the range of 95 to 98%.

11. The instrument as claimed in claim 9, wherein the void volume of the solid-material-trapping layer is in the range of 65 to 95%.

12. The instrument as claimed in claim 9, wherein the volume filtration layer has a density of 0.02 to 0.15 g/cm³.

13. The instrument as claimed in claim 9, wherein the volume filtration layer has a density of 0.04 to 0.08 g/cm³.

14. The instrument as claimed in claim 9, wherein the solid material-trapping layer is essentially composed of glass fibers and having a density of 0.1 to 0.5 g/cm³.

15. The instrument as claimed in claim 9, wherein the volume filtration layer is essentially composed of a fibrous material selected from the group consisting of glass fibers, natural organic fibers, semi-synthetic organic fibers, or synthetic organic fibers.

16. The instrument as claimed in claim 9, wherein the solid-material-trapping layer is made of a fibrous material selected from the group consisting of glass fibers, natural organic fibers, semi-synthetic organic fibers, synthetic organic fibers or blushed polymer.

* * * * *

UNITED STATES PATENT AND TRADEMARK OFFICE
CERTIFICATE OF CORRECTION

PATENT NO. : 4,810,394

DATED : March 7, 1989

INVENTOR(S) : Nobuhito MASUDA

It is certified that error appears in the above-identified patent and that said Letters Patent is hereby corrected as shown below:

Claim 9, column 9, line 23 change "in the range of 0.5 um" to --in the range of 0.1 to 5 um--.

Signed and Sealed this

Twenty-first Day of May, 1991

Attest:

HARRY F. MANBECK, JR.

Attesting Officer

Commissioner of Patents and Trademarks